US011964857B2

(12) United States Patent
Baranyai

(10) Patent No.: US 11,964,857 B2
(45) Date of Patent: Apr. 23, 2024

(54) LIFT AND GUARD

(71) Applicant: Best Process Solutions, Inc., Brunswick, OH (US)

(72) Inventor: Gabor Baranyai, Cuyahoga Falls, OH (US)

(73) Assignee: BEST PROCESS SOLUTIONS, INC., Brunswick, OH (US)

( * ) Notice: Subject to any disclaimer, the term of this patent is extended or adjusted under 35 U.S.C. 154(b) by 367 days.

(21) Appl. No.: 17/486,976

(22) Filed: Sep. 28, 2021

(65) Prior Publication Data

US 2023/0094271 A1 Mar. 30, 2023

(51) Int. Cl.
*B66F 7/06* (2006.01)
*B66F 7/28* (2006.01)

(52) U.S. Cl.
CPC ................ *B66F 7/065* (2013.01); *B66F 7/28* (2013.01)

(58) Field of Classification Search
CPC .................................... B66F 7/065; B66F 7/28
USPC ............... 108/144.11, 145, 147; 254/10, 122
See application file for complete search history.

(56) References Cited

U.S. PATENT DOCUMENTS 4,688,760 A * 8/1987 Garman ................... A47C 3/38 254/122
5,358,217 A * 10/1994 Dach ......................... B66F 3/00 254/134
7,103,952 B2 * 9/2006 Appleton .............. F01D 25/285 244/54
7,225,898 B2 * 6/2007 Bourgeois ............. B66B 9/0861 182/69.6
7,677,518 B2 * 3/2010 Chouinard ......... F16M 11/2092 248/370
8,127,919 B2 3/2012 Harris et al.
2003/0064193 A1 * 4/2003 Day ................... B23Q 11/0816 428/126
2006/0045710 A1 * 3/2006 Hiebert ..................... B66F 7/02 414/631
2006/0104760 A1 * 5/2006 Cecil ....................... B66F 7/065 414/399
2011/0220454 A1 * 9/2011 Harris .................... B65G 13/00 193/35 TE
2020/0071141 A1 3/2020 Kritzer et al.

FOREIGN PATENT DOCUMENTS

CH 698089 B1 * 5/2009 ............. B66F 7/065
EP 3808695 A1 * 4/2021
EP 3808695 A1 4/2021
JP 10-087291 A 4/1998

OTHER PUBLICATIONS

International Search Report and Written Opinion of the International Searching Authority dated Dec. 20, 2022 of corresponding PCT/US2022/076688, Filed Sep. 20, 2022.

* cited by examiner

*Primary Examiner* — Jose V Chen
(74) *Attorney, Agent, or Firm* — Pearne & Gordon LLP

(57) ABSTRACT

A lift for elevating an object having a base including two legs, lifting apparatus associated with each leg, vertically telescoping guard elements extending along each leg, the lifting apparatus being arranged to lift an object disposed above a plane between said legs, the guard elements telescoping vertically when the lifting apparatus is deployed to exclude a person's limb from a space above said planes.

7 Claims, 4 Drawing Sheets

FIG. 1
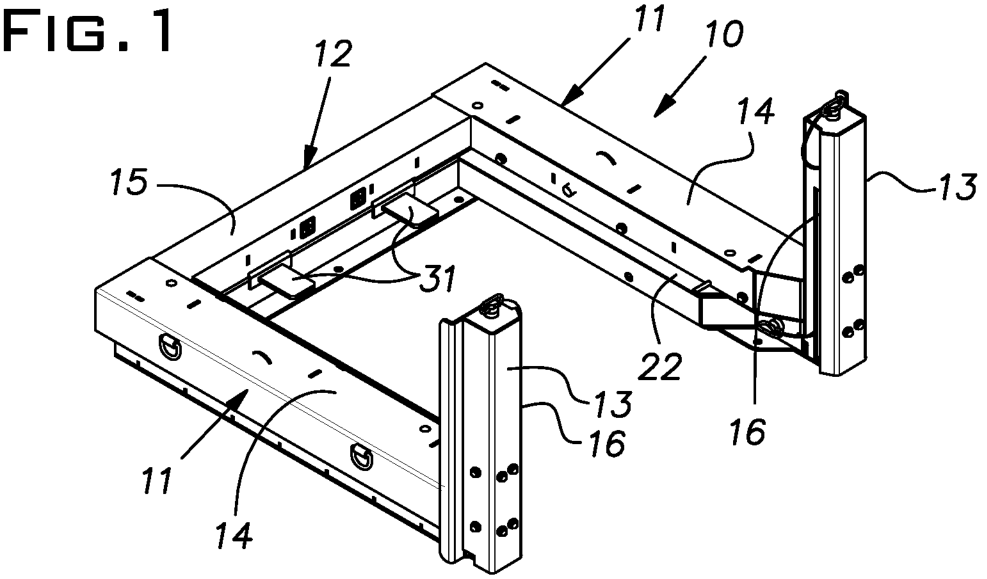
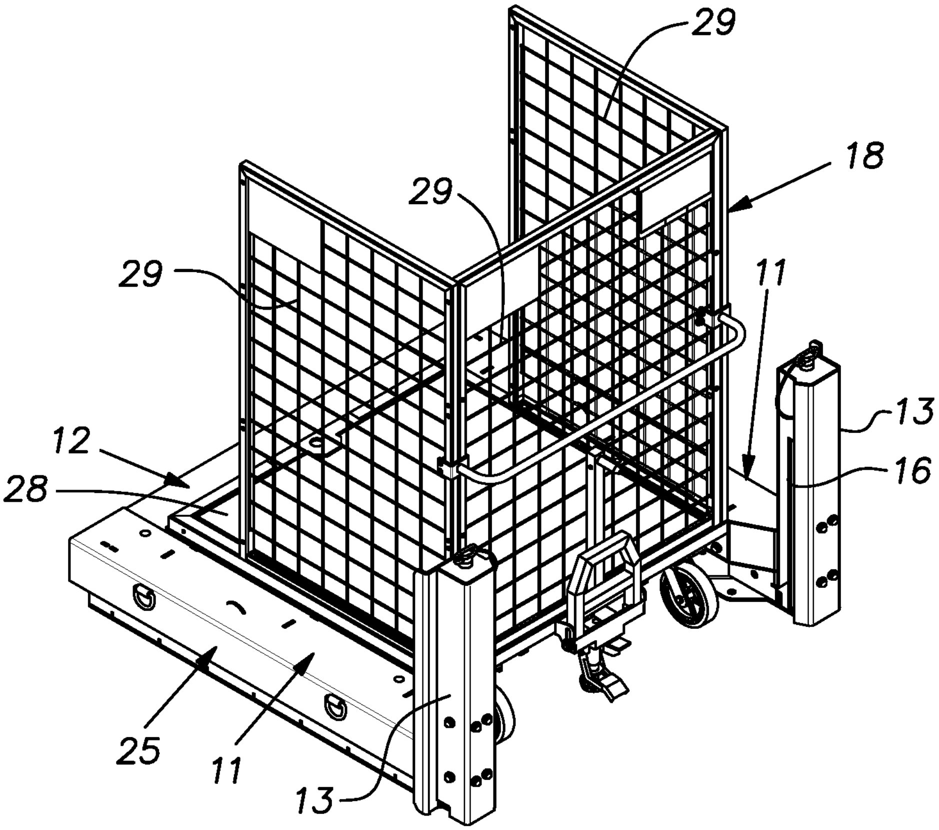
FIG. 2

LIFT AND GUARD

BACKGROUND OF THE INVENTION

The invention relates to devices for lifting objects and, in particular, for lifting carts carrying packages.

PRIOR ART

Numerous lifting devices are known. A common style lift uses a scissor mechanism when a low height in a lowered or retracted position is desired and the raised position is high compared to the retracted position height.

SUMMARY OF THE INVENTION

The invention provides a lift for a cart, or other purpose having an integrated guard that telescopes up or down with elevation or descension of the lift. The guard, formed of horizontal sheet metal slats or elongated panels, exists on three sides of the lift with a safety light curtain on the fourth side. The guard and light curtain assure that a person's limb or limbs are not in the path of the lift when it descends, thereby avoiding potential injury.

A scissor lift arrangement is utilized to raise the cart or other load a distance substantially higher than its retracted height thereby enabling the lift to raise a bottom platform of a cart nearly waist high. An open side of the lift, where the safety light curtain is located, enables a wheeled cart to be positioned over the lifting elements without the need to open or close a gate or the like. Personnel, working at a side of the lift opposite the side with the safety light curtain, are protected by the guard slats while having freedom of motion that might otherwise be prohibited by a safety light curtain.

BRIEF DESCRIPTION OF THE DRAWING

FIG. 1 is an isometric view of the lift and guard in a retracted or lowered position;

FIG. 2 is a view similar to FIG. 1 but showing a wheeled cart received on the lift;

DESCRIPTION OF THE PREFERRED EMBODIMENT

A combined lift and guard assembly 10 of the invention is U-shaped in plan view as can be visualized in the retracted position of FIG. 1. The assembly 10 includes two horizontal legs 11 and a horizontal cross member 12 joining adjacent ends of the legs 11. At leg ends opposite the cross member 12 are vertically extending posts or ballards 13 that are stationary when parts of the legs 11 and cross member 12 are raised or lowered. The components of the assembly 10 are primarily steel plates and sheet fabricated and where appropriate welded together.

Figure 3:
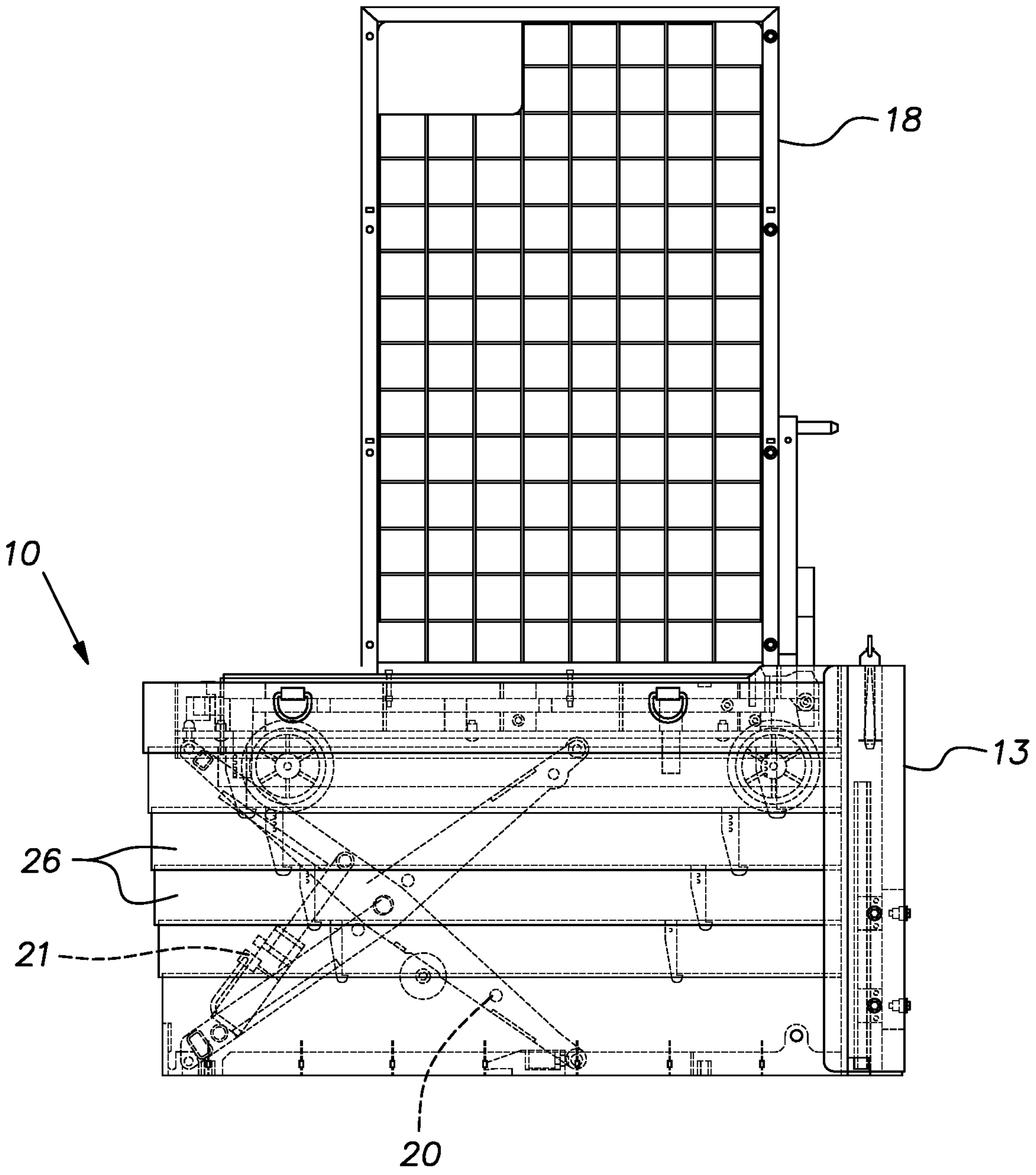
FIG. 3 is a side view of the lift supporting the wheeled cart at an upper position and the guard telescoped to reach the upper lift position.
Figure 4:
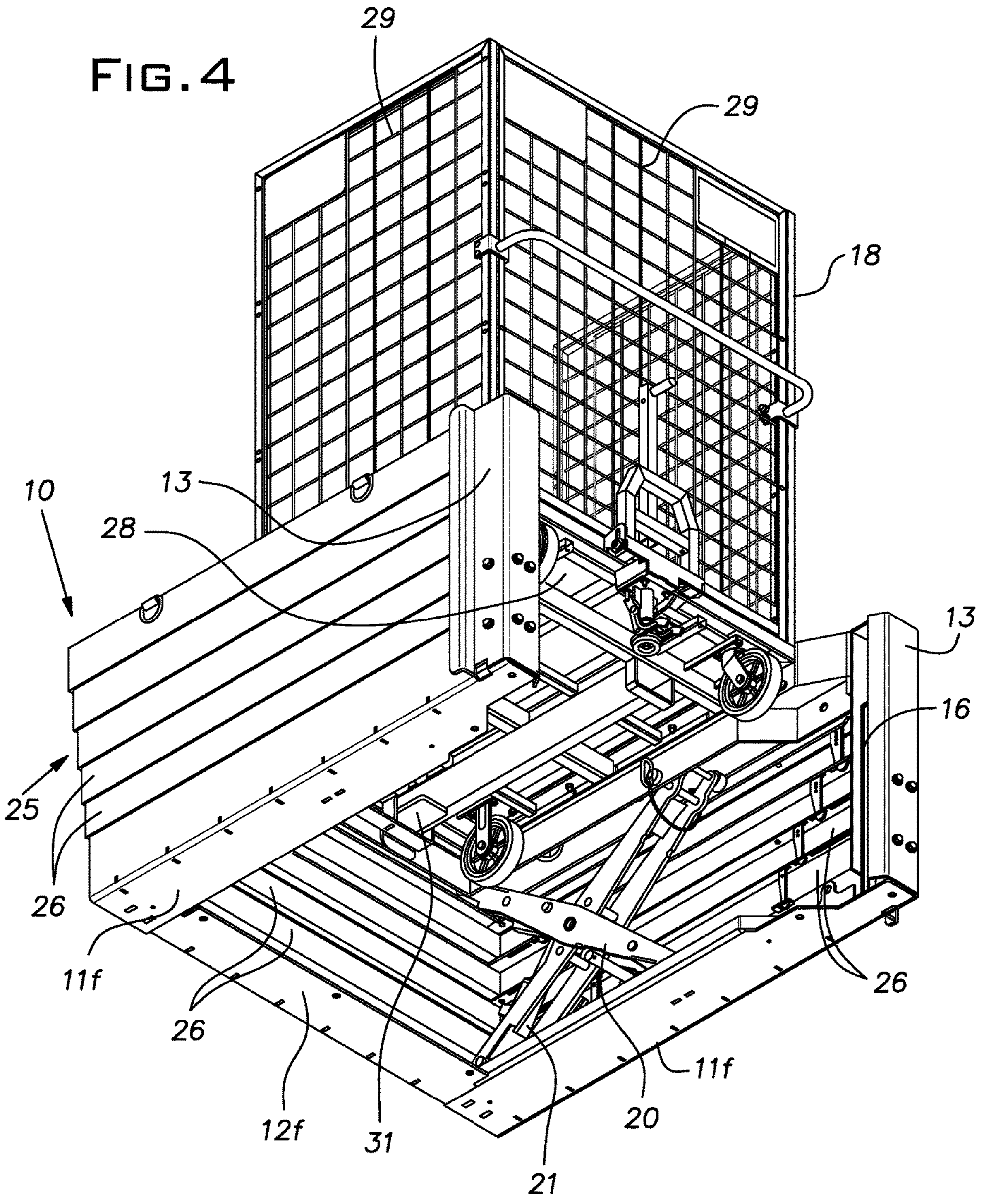
FIG. 4 is an isometric view of the bottom of the lift and guard in an elevated or extended position.

Stationary lower parts, fixed to the floor, are labeled with the suffix "f" in FIG. 4. Bottom elements of the legs 11 and cross member 12 can be lengths of steel channel welded together where they meet.

Top elements 14, 15 of the legs 11 and cross member 12 are welded together and serve to raise a wheeled cart, described below. A scissor lift or mechanism 20 (FIG. 4) exists in each of the legs 11 between the lower element **11*f* and top element 14. Each scissor lift 20 is actuated by a hydraulic piston and cylinder 21 pivotally connected to a pair of bars of the scissor 20. The legs 11** are tapered at the scissor lift's open end to allow unobstructed circular motion of the wheeled cart's rotating casters when the cart is pushed in place, thus preventing the casters jamming against the side walls of the legs.

Figure 5A:
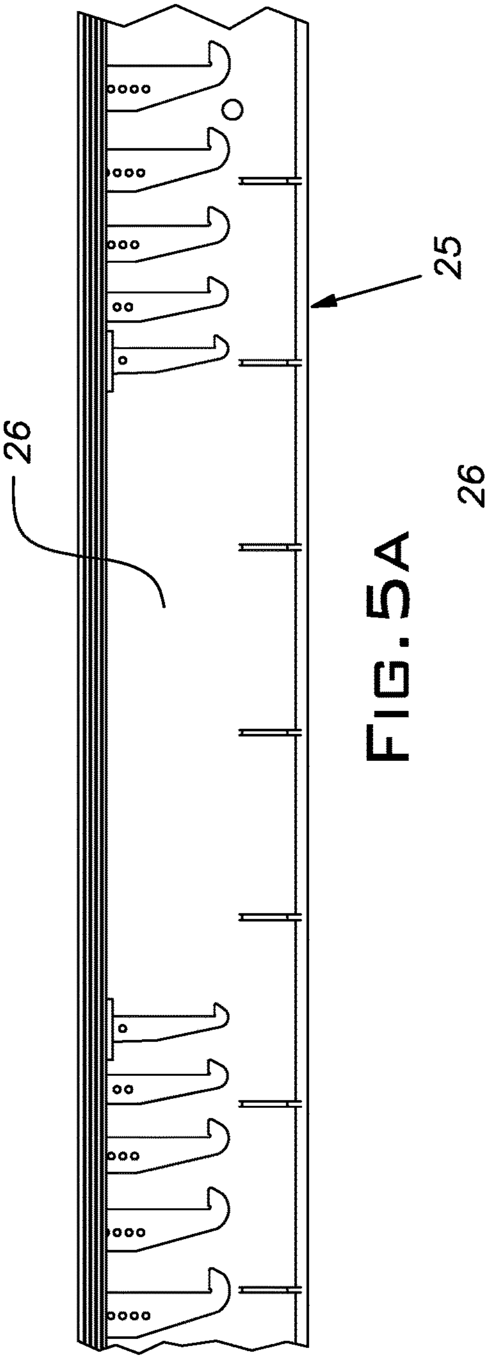
FIGS. 5A, 5B are schematic illustrations of the telescoping connection between adjacent segments of the guard.
Figure 5B:
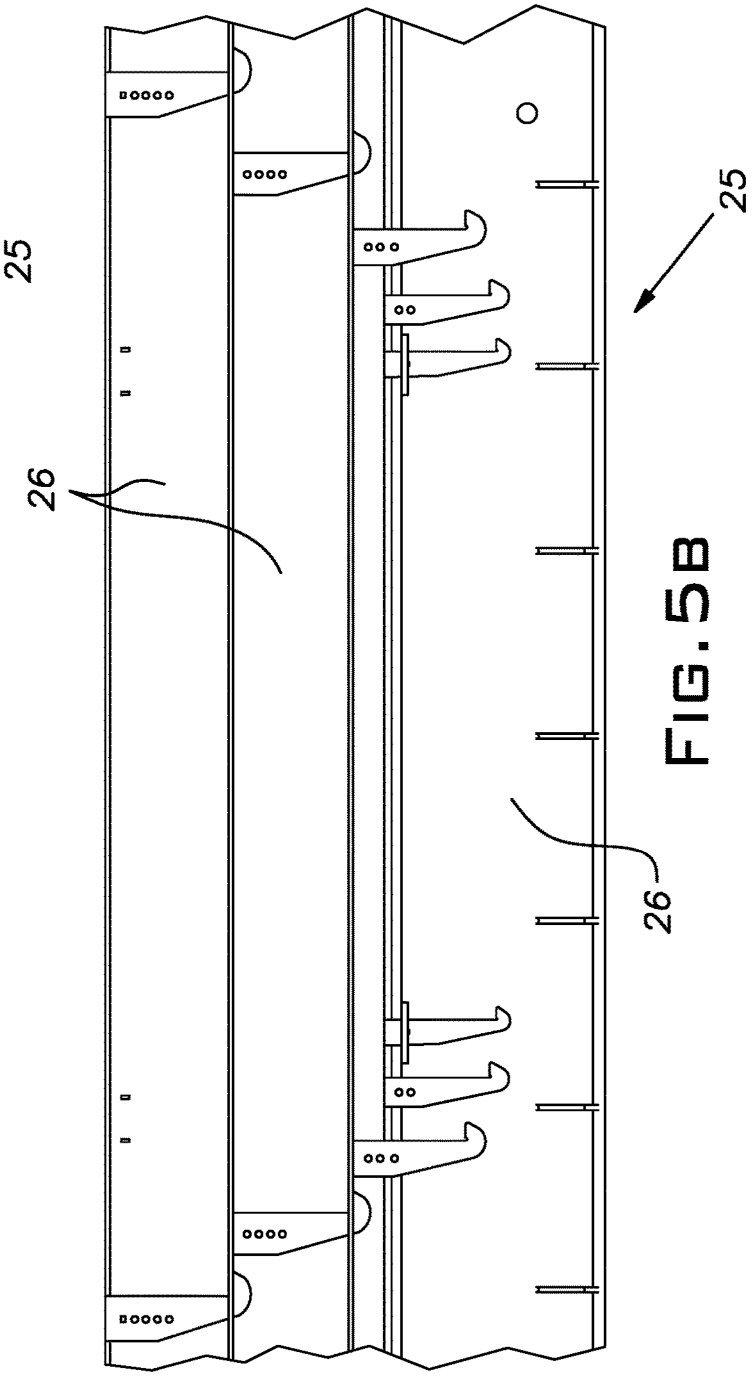

The top parts 14, 15 overlie a telescoping guard 25. The guard 25 is preferably formed of sheet steel slats or leaves 26. Each slat 26 is U-shaped to conform to the U-shape of the assembly 10 and each U-shaped slat is smaller than a slat above it when the guard 25 is deployed or raised. An upper slat 26 is attached to the top parts 14, 15 and a lower slat 26 is attached to the lower parts **11*f*, 12*f*. FIGS. 5A and 5**B viewing from inside the guard show how the slats are interconnected with sheet metal hooks that raise the slat beneath a preceding raised slat.

Each hook's profile contains a vertical guide edge which maintains the horizontal position of the interconnected u-shaped guards while the scissor lift is being raised or lowered. The cross sectional width of each hook at their bottom lifting end is equivalent or less to the cross sectional width at the top mounting end to enable stacking the u-shaped guards on top of each other during assembly without the need for separating the hooks from the u-shaped guards prior to assembly.

Associated with the ballards 13 is a safety light curtain 16 having a light source and photodetectors generally indicated at 16 and serving as a guard that senses the presence of objects or personnel in the space between the ballards 13 and disables the lift from moving. A control console including a hydraulic pump and other components (not shown) can be used by an operator to raise and lower the assembly 10 and is responsive to signals from the safety light curtain 16.

The lift and guard assembly 10 is particularly suited for use with a wheeled cart 27 depicted in several FIGS. Edge elements 22 of the top parts 11 fit under opposite sides of the cart 27 and engage a cart platform 28 when the assembly 10 is initially raised. Stubby forks 31 fixed on the top part 15 stabilize the cart to prevent it from tipping. The cart 27 has three wire mesh or screen sides 29 and one open side. The cart 27 may be used to transport small randomly oriented packages piled on the platform 28. Packages can be manually removed from the cart through the open side. The described lift and guard assembly 10 can be used to lift the cart platform 28, at an appropriate time after packages in the upper part of the cart 27 have been unloaded, thereby reducing bending over motion of workers unloading the cart.

Particularly important is the function of the guard 25 and light curtain 16 in excluding worker's limbs from the space under and adjacent the raised elements 11, 12 and cart platform 28, thereby preventing injury when the assembly 10 is lowered. The hydraulic pistons and cylinders 21 of the scissor lift mechanism 20 are hydraulically locked when the light curtain 16 is interrupted.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A lift for elevating an object having a base including two floor supported horizontal legs, each leg having spaced ends adjacent the ends of the other leg, separate lifting apparatus associated with each leg, vertically telescoping guard elements extending along each leg, the lifting apparatus being arranged to receive and lift an object disposed above a plane between said legs, the guard elements telescoping vertically when the lifting apparatus is deployed to exclude a person's limb from a space above said plane, a rigid frame member extending between and fixed to adjacent ends of said legs, said guard elements have a U-shape in plan view enabling them to simultaneously extend along said legs and frame member.

2. A lift as set forth in claim 1, wherein said guard elements extend along said rigid frame member.

3. A lift as set forth in claim 1, wherein said lifting apparatus includes a scissor mechanism associated with each leg.

4. A lift as set forth in claim 3, wherein said scissor mechanisms are each aligned with a respective leg.

5. A lift as set forth in claim 3, wherein each leg has a lower ground engaging part and an upper part, and a scissor mechanism disposed between said ground engaging part and said upper part, the upper part having an element for supporting and lifting an object.

6. A lift as set forth in claim 1, including a safety light curtain extending between said legs at ends opposite said adjacent ends.

7. A lift as set forth in claim 1, including a vertical post at each leg end remote from said adjacent leg ends.

* * * * *